United States Patent
Chan et al.

(10) Patent No.: US 9,761,181 B2
(45) Date of Patent: *Sep. 12, 2017

(54) COLOR DISPLAY DEVICE

(71) Applicant: E Ink California, LLC., Fremont, CA (US)

(72) Inventors: Bryan Hans Chan, San Francisco, CA (US); Craig Lin, Oakland, CA (US); Hui Du, Milpitas, CA (US); Ming Wang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,407

(22) Filed: Feb. 6, 2017

(65) Prior Publication Data

US 2017/0148395 A1    May 25, 2017

Related U.S. Application Data

(63) Continuation of application No. 14/794,689, filed on Jul. 8, 2015.

(60) Provisional application No. 62/022,557, filed on Jul. 9, 2014.

(51) Int. Cl.
*G02F 1/167*    (2006.01)
*G09G 3/34*    (2006.01)
*G09G 3/20*    (2006.01)

(52) U.S. Cl.
CPC ........... *G09G 3/3446* (2013.01); *G02F 1/167* (2013.01); *G09G 3/2003* (2013.01); *G09G 2310/068* (2013.01); *G09G 2320/0238* (2013.01); *G09G 2320/0242* (2013.01); *G09G 2320/066* (2013.01)

(58) Field of Classification Search
CPC .............................. G02F 1/167; G02B 26/026
See application file for complete search history.

(56) References Cited

U.S. PATENT DOCUMENTS

| 6,017,584 A | 1/2000 | Albert |
| 6,545,797 B2 | 4/2003 | Chen |
| 6,664,944 B1 | 12/2003 | Albert |
| 6,781,745 B2 | 8/2004 | Chung |
| 6,788,452 B2 | 9/2004 | Liang |

(Continued)

FOREIGN PATENT DOCUMENTS

| JP | 2006343458 | 12/2006 |
| JP | 2007140129 | 6/2007 |

(Continued)

OTHER PUBLICATIONS

Kawaguchi, Seigou et al; Synthesis of polyethylene macromonomers and their radical copolymerizations with methyl methacrylate in homogeneous and oligoethylene melts media; Designed Monomers and Polymers 2000; vol. 3, No. 3; (2000); pp. 263-277. Jan. 1, 2000.

(Continued)

*Primary Examiner* — Ricardo L Osorio
(74) *Attorney, Agent, or Firm* — David J. Cole

(57) ABSTRACT

The present invention is directed to a color display device in which each pixel can display at least six high-quality color states, and an electrophoretic fluid for such an electrophoretic display. The different types of particles exhibit different levels of attraction force to display different color states.

14 Claims, 13 Drawing Sheets

(56) References Cited

U.S. PATENT DOCUMENTS

| | | |
|---|---|---|
| 6,864,875 B2 | 3/2005 | Drzaic |
| 6,914,714 B2 | 7/2005 | Chen |
| 6,930,818 B1 | 8/2005 | Liang |
| 6,972,893 B2 | 12/2005 | Chen |
| 7,038,655 B2 | 5/2006 | Herb |
| 7,038,656 B2 | 5/2006 | Liang |
| 7,038,670 B2 | 5/2006 | Liang |
| 7,046,228 B2 | 5/2006 | Liang |
| 7,052,571 B2 | 5/2006 | Wang |
| 7,075,502 B1 | 7/2006 | Drzaic |
| 7,167,155 B1 | 1/2007 | Albert |
| 7,292,386 B2 | 11/2007 | Kanbe |
| 7,312,916 B2 | 12/2007 | Pullen |
| 7,345,810 B2 | 3/2008 | Chopra |
| 7,385,751 B2 | 6/2008 | Chen |
| 7,433,113 B2 | 10/2008 | Chopra |
| 7,492,505 B2 | 2/2009 | Liang |
| 7,609,435 B2 | 10/2009 | Moriyama |
| 7,636,076 B2 | 12/2009 | Hung |
| 7,652,656 B2 | 1/2010 | Chopra |
| 7,656,576 B2 | 2/2010 | Suwabe |
| 7,667,684 B2 | 2/2010 | Jacobson et al. |
| 7,684,108 B2 | 3/2010 | Wang |
| 7,791,789 B2 | 9/2010 | Albert |
| 7,800,813 B2 | 9/2010 | Wu |
| 7,821,702 B2 | 10/2010 | Liang |
| 7,839,564 B2 | 11/2010 | Whitesides et al. |
| 7,848,009 B2 | 12/2010 | Machida |
| 7,910,175 B2 | 3/2011 | Webber |
| 7,952,790 B2 | 5/2011 | Honeyman |
| 7,956,841 B2 | 6/2011 | Albert |
| 7,982,941 B2 | 7/2011 | Lin |
| 8,040,594 B2 | 10/2011 | Paolini, Jr. |
| 8,054,288 B2 | 11/2011 | Sugita |
| 8,054,526 B2 | 11/2011 | Bouchard |
| 8,054,535 B2 * | 11/2011 | Sikharulidze ........... G02F 1/167 359/295 |
| 8,067,305 B2 | 11/2011 | Zafiropoulo |
| 8,068,090 B2 | 11/2011 | Machida |
| 8,072,675 B2 * | 12/2011 | Lin ...................... G09G 3/3446 345/107 |
| 8,081,375 B2 | 12/2011 | Komatsu |
| 8,098,418 B2 | 1/2012 | Paolini, Jr. |
| 8,115,729 B2 | 2/2012 | Danner |
| 8,159,636 B2 | 4/2012 | Sun |
| 8,174,491 B2 | 5/2012 | Machida |
| 8,213,076 B2 | 7/2012 | Albert |
| 8,243,013 B1 | 8/2012 | Sprague |
| 8,363,299 B2 | 1/2013 | Paolini, Jr. |
| 8,422,116 B2 | 4/2013 | Sprague |
| 8,441,713 B2 | 5/2013 | Kawashima |
| 8,441,714 B2 | 5/2013 | Paolini, Jr. |
| 8,441,716 B2 | 5/2013 | Paolini, Jr. |
| 8,466,852 B2 | 6/2013 | Drzaic |
| 8,477,405 B2 | 7/2013 | Ishii |
| 8,491,767 B2 | 7/2013 | Gibson |
| 8,503,063 B2 | 8/2013 | Sprague |
| 8,520,296 B2 | 8/2013 | Wang |
| 8,565,522 B2 | 10/2013 | Swic |
| 8,570,639 B2 | 10/2013 | Masuzawa |
| 8,574,937 B2 | 11/2013 | Shi |
| 8,576,470 B2 | 11/2013 | Paolini, Jr. |
| 8,576,475 B2 | 11/2013 | Huang |
| 8,576,476 B2 | 11/2013 | Telfer |
| 8,593,721 B2 | 11/2013 | Albert |
| 8,605,354 B2 | 12/2013 | Zhang |
| 8,629,832 B2 | 1/2014 | Tanabe |
| 8,649,084 B2 | 2/2014 | Wang |
| 8,670,174 B2 | 3/2014 | Sprague |
| 8,687,265 B2 | 4/2014 | Ahn |
| 8,704,754 B2 | 4/2014 | Machida |
| 8,704,756 B2 | 4/2014 | Lin |
| 8,717,662 B2 | 5/2014 | Komatsu |
| 8,717,664 B2 | 5/2014 | Wang |
| 8,786,935 B2 | 7/2014 | Sprague |
| 8,797,634 B2 | 8/2014 | Paolini, Jr. |
| 8,810,899 B2 | 8/2014 | Sprague |
| 8,830,559 B2 | 9/2014 | Honeyman et al. |
| 8,873,129 B2 | 10/2014 | Paolini, Jr. |
| 8,902,153 B2 | 12/2014 | Bouchard |
| 8,902,491 B2 | 12/2014 | Wang |
| 8,917,493 B2 | 12/2014 | Wang |
| 8,963,903 B2 | 2/2015 | Sakamoto |
| 8,964,282 B2 | 2/2015 | Wang |
| 8,988,764 B2 | 3/2015 | Abe |
| 9,013,516 B2 | 4/2015 | Sakamoto |
| 9,013,783 B2 | 4/2015 | Sprague |
| 9,052,564 B2 | 6/2015 | Sprague |
| 9,116,412 B2 | 8/2015 | Lin |
| 9,146,439 B2 | 9/2015 | Zhang |
| 9,164,207 B2 | 10/2015 | Honeyman et al. |
| 9,170,467 B2 | 10/2015 | Whitesides |
| 9,170,468 B2 | 10/2015 | Lin |
| 9,182,646 B2 | 11/2015 | Paolini, Jr. |
| 9,195,111 B2 | 11/2015 | Anseth |
| 9,199,441 B2 | 12/2015 | Danner |
| 9,251,736 B2 | 2/2016 | Lin |
| 9,268,191 B2 | 2/2016 | Paolini, Jr. |
| 9,285,649 B2 | 3/2016 | Du |
| 9,293,511 B2 | 3/2016 | Jacobson |
| 9,341,916 B2 | 5/2016 | Telfer et al. |
| 9,360,733 B2 | 6/2016 | Wang |
| 9,361,836 B1 | 6/2016 | Telfer |
| 9,423,666 B2 | 8/2016 | Wang |
| 9,436,056 B2 | 9/2016 | Paolini, Jr. |
| 9,459,510 B2 | 10/2016 | Lin |
| 9,513,527 B2 | 12/2016 | Chan |
| 9,541,814 B2 | 1/2017 | Lin |
| 2008/0042928 A1 | 2/2008 | Schlangen |
| 2008/0043318 A1 | 2/2008 | Whitesides |
| 2008/0048970 A1 | 2/2008 | Drzaic |
| 2008/0062159 A1 | 3/2008 | Roh |
| 2008/0117165 A1 | 5/2008 | Machida |
| 2009/0225398 A1 | 9/2009 | Duthaler |
| 2009/0251763 A1* | 10/2009 | Sprague .................. G02F 1/167 359/296 |
| 2010/0156780 A1 | 6/2010 | Jacobson |
| 2010/0290103 A1* | 11/2010 | Fontana ............. C09B 67/0008 359/296 |
| 2011/0043543 A1 | 2/2011 | Chen |
| 2012/0299947 A1 | 11/2012 | Tsuda |
| 2012/0326957 A1 | 12/2012 | Drzaic |
| 2013/0242378 A1 | 9/2013 | Paolini, Jr. |
| 2013/0278995 A1 | 10/2013 | Drzaic |
| 2014/0011913 A1 | 1/2014 | Du |
| 2014/0055840 A1 | 2/2014 | Zang |
| 2014/0078576 A1 | 3/2014 | Sprague |
| 2014/0340430 A1 | 11/2014 | Telfer |
| 2014/0362213 A1 | 12/2014 | Tseng |
| 2015/0103394 A1 | 4/2015 | Wang |
| 2015/0118390 A1 | 4/2015 | Rosenfeld |
| 2015/0124345 A1 | 5/2015 | Rosenfeld |
| 2015/0268531 A1 | 9/2015 | Wang |
| 2015/0301246 A1 | 10/2015 | Zang |
| 2016/0011484 A1* | 1/2016 | Chan .................. G09G 3/344 345/691 |
| 2016/0026062 A1 | 1/2016 | Zhang |
| 2016/0048054 A1 | 2/2016 | Danner |
| 2016/0116816 A1 | 4/2016 | Paolini |
| 2016/0140909 A1 | 5/2016 | Lin |

FOREIGN PATENT DOCUMENTS

| | | |
|---|---|---|
| JP | 2008033000 | 2/2008 |
| JP | 2008209589 | 9/2008 |
| JP | 2009116041 | 5/2009 |
| JP | 2009192637 | 8/2009 |
| JP | 2011158783 | 8/2011 |
| KR | 1020070082680 | 8/2007 |

(56) References Cited

FOREIGN PATENT DOCUMENTS

KR  1020110103765  9/2011
TW     201346413  11/2013

OTHER PUBLICATIONS

Korean Intellectual Property Office; PCT/US2015/039563; International Search Report and Written Opinion; Oct. 26, 2015. Oct. 26, 2015.

* cited by examiner

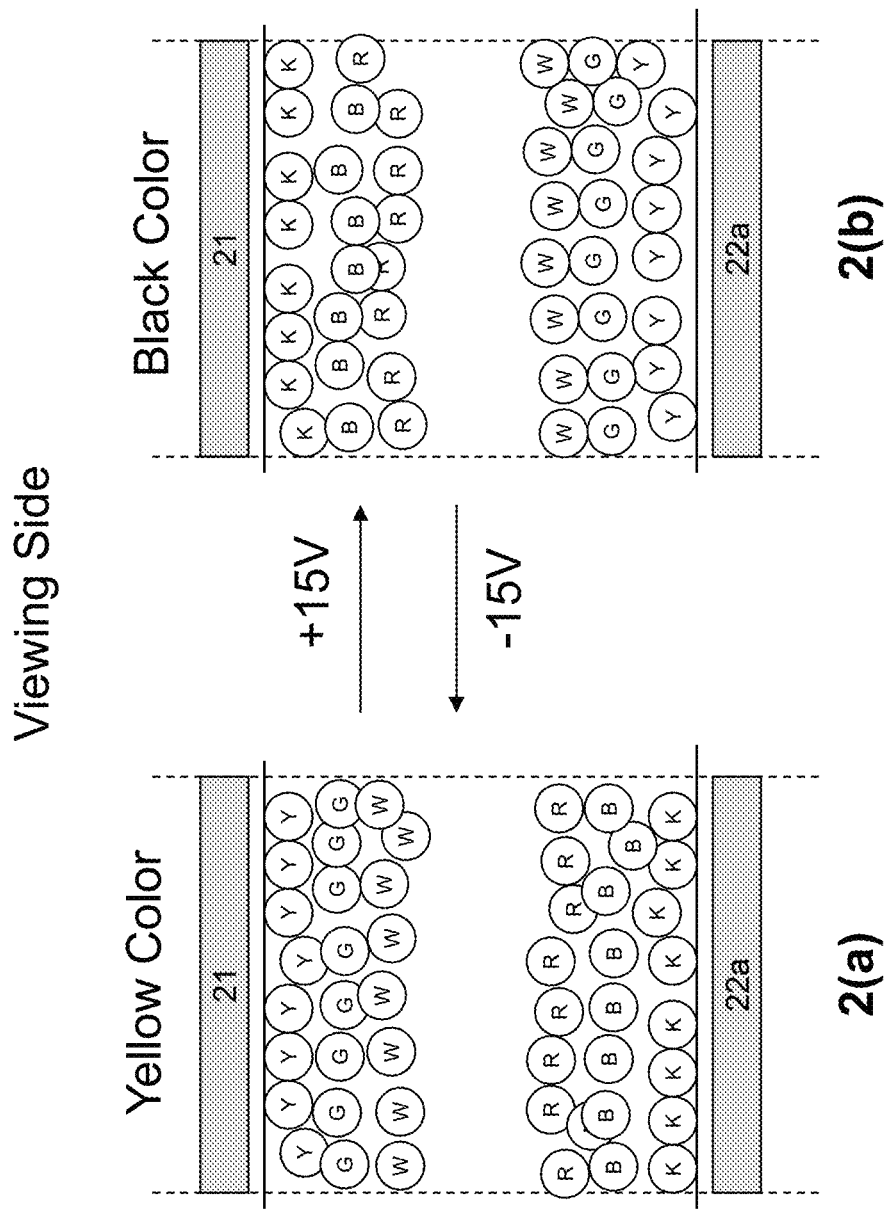

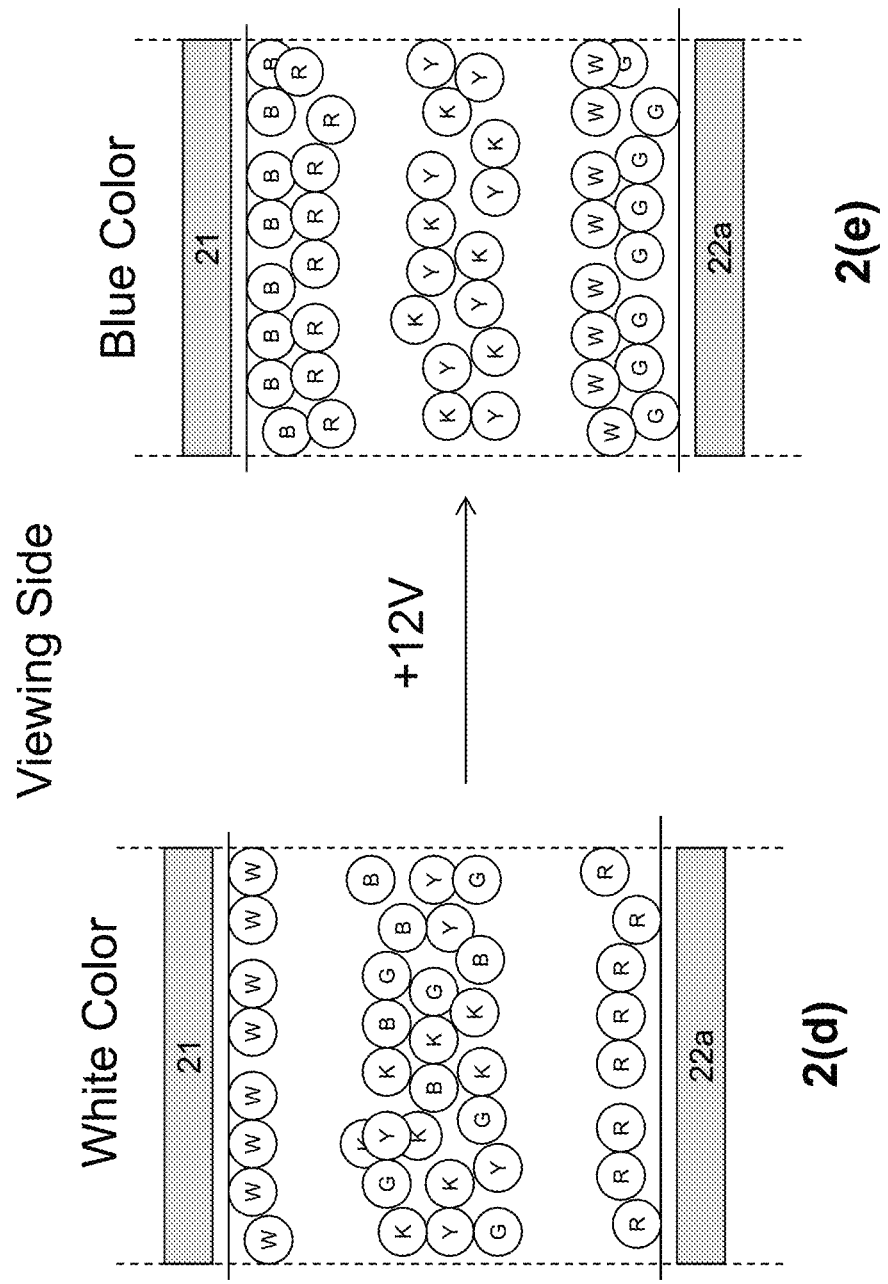

COLOR DISPLAY DEVICE

REFERENCE TO RELATED APPLICATIONS

This application is a continuation of copending application Ser. No. 14/794,689, filed Jul. 8, 2015 (Publication No. 2016/0011484), which claims the benefit of U.S. Provisional Application No. 62/022,557, filed Jul. 9, 2014; both of the aforementioned applications are incorporated herein by reference in their entirety.

FIELD OF THE INVENTION

The present invention relates to a color display device in which each pixel can display multiple high-quality color states, and an electrophoretic fluid for such an electrophoretic display.

BACKGROUND OF THE INVENTION

In order to achieve a color display, color filters are often used. The most common approach is to add color filters on top of black/white sub-pixels of a pixellated display to display the red, green and blue colors. When a red color is desired, the green and blue sub-pixels are turned to the black state so that the only color displayed is red. When a blue color is desired, the green and red sub-pixels are turned to the black state so that the only color displayed is blue. When a green color is desired, the red and blue sub-pixels are turned to the black state so that the only color displayed is green. When the black state is desired, all three-sub-pixels are turned to the black state. When the white state is desired, the three sub-pixels are turned to red, green and blue, respectively, and as a result, a white state is seen by the viewer.

The biggest disadvantage of using such a technique for a reflective display is that since each of the sub-pixels has a reflectance of about one third of the desired white state, the white state is fairly dim. To compensate this, a fourth sub-pixel may be added which can display only the black and white states, so that the white level is doubled at the expense of the red, green or blue color level (where each sub-pixel is only one fourth of the area of the pixel). Brighter colors can be achieved by adding light from the white pixel, but this is achieved at the expense of color gamut to cause the colors to be very light and unsaturated. A similar result can be achieved by reducing the color saturation of the three sub-pixels. Even with this approach, the white level is normally substantially less than half of that of a black and white display, rendering it an unacceptable choice for display devices, such as e-readers or displays that need well readable black-white brightness and contrast.

BRIEF DESCRIPTION OF THE DRAWINGS

FIGS. 2-1 to 2-7 illustrate how different color states can be displayed.

FIG. 3 demonstrates single driving pulses.

FIG. 4 demonstrates pulsing waveforms.

FIGS. 5 and 6 illustrate alternative driving schemes.

FIG. 7 demonstrates display cells unaligned with pixel electrodes.

DETAILED DESCRIPTION OF THE INVENTION

The electrophoretic fluid of the present invention comprises at least six types of particles dispersed in a dielectric solvent or solvent mixture.

Figure 1:
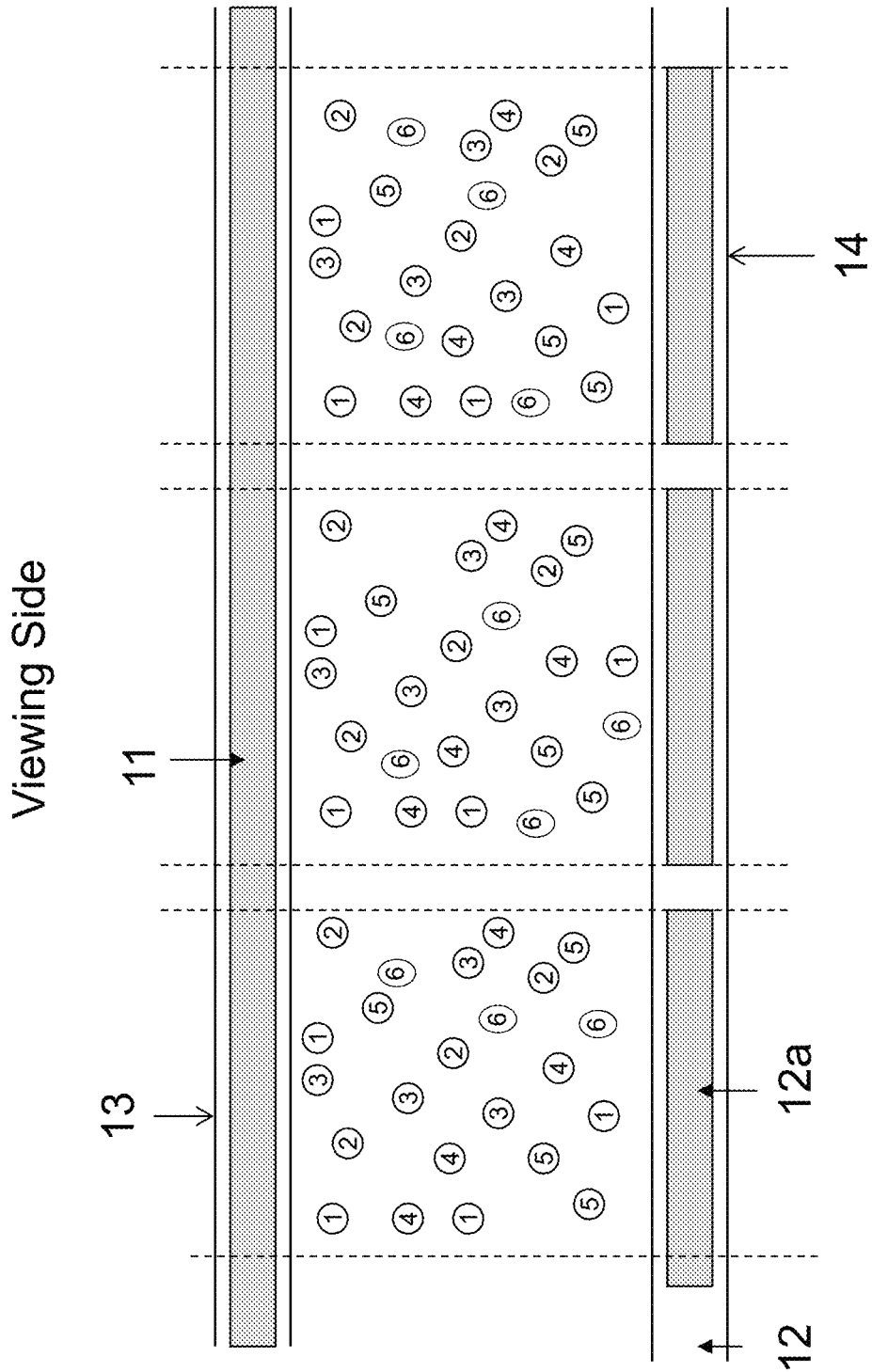
FIG. 1 depicts a display layer which can display different color states.

The particles may be referred to as a first type of particles, a second type of particles, a third type of particles, a fourth type of particles, a fifth type of particles and a sixth type of particles, as shown in FIG. 1. The six types of particles are of different colors.

It is understood that the scope of the invention broadly encompasses particles of any colors as long as the multiple types of particles are visually distinguishable. As an example, the six types of particles may be any combinations of white particles (W), black particles (K), red particles (R), green particles (G), blue particles (B), cyan particles (C), magenta particles (M) and yellow particles (Y).

In addition to the colors, the six different types of particles may have other distinct optical characteristics, such as optical transmission, reflectance, luminescence or, in the case of displays intended for machine reading, pseudo-color in the sense of a change in reflectance of electromagnetic wavelengths outside the visible range.

In addition, the six types of particles have different levels of charge potential. For example, the six types of particles may be high-positive particles, mid-positive particles, low-positive particles, high-negative particles, mid-negative and low-negative particles.

It is noted that the term "charge potential", in the context of the present application, may be used interchangeably with "zeta potential".

The charge polarities and levels of charge potential of the particles may be tuned, according to the method described in U.S. Patent Application Publication No. 2014/0011913, the content of which is incorporated herein by reference in its entirety.

The magnitudes of the "high-positive" particles and the "high-negative" particles may be the same or different. Likewise, the magnitudes of the "mid-positive" particles and the "mid-negative" particles may be the same or different, and the magnitudes of the "low-positive" particles and the "low-negative" particles may be the same or different.

The charge potentials of the particles may be measured in terms of zeta potential. In one embodiment, the zeta potential is determined by Colloidal Dynamics AcoustoSizer TIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (SOL-SPERSE® 17000, available from Lubrizol Corporation, a Berkshire Hathaway company), with a weight ratio of 1:10 of the charge control agent to the particles. The mass of the diluted sample is determined and the sample is then loaded into the flow-through cell for determination of the zeta potential.

As shown, the display fluid is sandwiched between two electrode layers. One of the electrode layers is a common electrode (11) which is a transparent electrode layer (e.g., ITO), spreading over the entire top of the display device. The other electrode layer (12) is a layer of pixel electrodes (12a).

The space between two dotted vertical lines denotes a pixel. Therefore, each pixel has a corresponding pixel electrode (12a).

The pixel electrodes are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

As also shown in FIG. 1, a display device utilizing the display fluid of the present invention has two surfaces, a first surface (13) on the viewing side and a second surface (14) on the opposite side of the first surface (13). The second surface therefore is on the non-viewing side. The term "viewing side" refers to the side at which images are viewed.

The solvent in which the particles are dispersed is clear and colorless. It preferably has a dielectric constant in the range of about 2 to about 30, more preferably about 2 to about 15 for high particle mobility. Examples of suitable dielectric solvent include hydrocarbons such as isoparaffin, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Delaware, polydimethylsiloxane based silicone oil from Dow-corning (DC-200).

The particles are preferably opaque. They may be primary particles without a polymer shell. Alternatively, each particle may comprise an insoluble core with a polymer shell. The core could be either an organic or inorganic pigment, and it may be a single core particle or an aggregate of multiple core particles. The particles may also be hollow particles.

In the case of white particles (W), the primary particles or core particles may be $TiO_2$, $ZrO_2$, $ZnO$, $Al_2O_3$, $Sb_2O_3$, $BaSO_4$, $Pb\ SO_4$ or the like.

For the black particles (K), the primary particles or core particles may be Cl pigment black 26 or 28 or the like (e.g., manganese ferrite black spinel or copper chromite black spinel) or carbon black.

For the other colored particles (which are non-white and non-black), the primary particles or core particles may include, but are not limited to, CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, F2G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

For the other colored particles (which are non-white and non-black), the primary particles or core particles may also be inorganic pigments, such as red, green, blue and yellow pigments. Examples may include, but are not limited to, CI pigment blue 28, CI pigment green 50 and CI pigment yellow 227.

The percentages of different types of particles in the fluid may vary. For example, one type of particles may take up 0.1% to 10%, preferably 0.5% to 5%, by volume of the electrophoretic fluid; another type of particles may take up 1% to 50%, preferably 5% to 20%, by volume of the fluid; and each of the remaining types of particles may take up 2% to 20%, preferably 4% to 10%, by volume of the fluid.

It is also noted that the six types of particles may have different particle sizes. For example, the smaller particles may have a size which ranges from about 50 nm to about 800 nm. The larger particles may have a size which is about 2 to about 50 times, more preferably about 2 to about 10 times, the sizes of the smaller particles.

An electrophoretic fluid of the present invention comprises six types of particles and the colors are displayed because of different levels of attraction forces among the particles.

Among the six types of particles, three types carry a charge polarity opposite from the charge polarity of the other three types.

EXAMPLE

Figure 2:
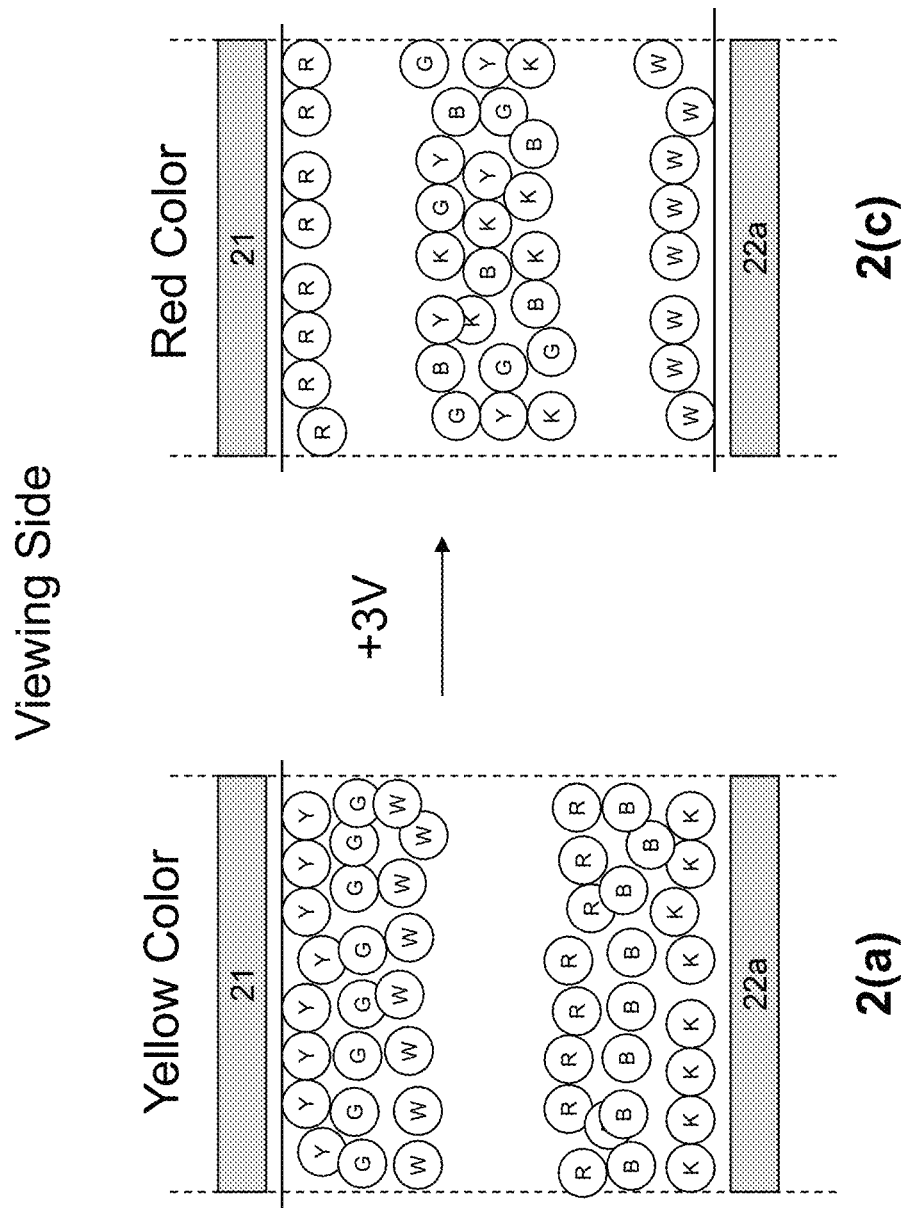

The following is an example illustrating the present invention. In this example as shown in FIG. 2, the black particles (K) (i.e., the first type) carry a positive charge and the yellow particles (Y) (i.e., the second type) carry a negative charge.

The blue (B) (i.e., the third type) and red (R) (i.e., the fifth type) particles are positively charged; but their magnitudes are progressively less than that of the black particles, which means that the black particles are high-positive particles, the blue particles are mid-positive particles and the red particles are low-positive particles.

The green (G) (i.e., the fourth type) and white (W) particles (i.e., the sixth type) are negatively charged; but their magnitude are progressively less than that of the yellow particles, which means that the yellow particles are high-negative particles, the green particles are mid-negative particles and the white particles are low-negative particles.

FIG. 2-1:

In FIG. 2-1, when a high negative driving voltage (e.g., −15V) is applied to the pixel (2b) for a time period of sufficient length, an electric field is generated to cause the high negative yellow particles to be pushed to the common electrode (21) side and the high positive black particles pulled to the pixel electrode (22a) side.

The low positive red and mid positive blue particles also move towards the pixel electrode, but move slower than the high positive black particles and as a result, the blue particles are above the black particles but below the red particles because the blue particles carry a higher charge potential than the red particles. The black particles are closest to the pixel electrode side.

The mid negative green particles and the low negative white particles also move towards the common electrode, but move slower than the high negative yellow particles, and therefore the green particles are above the white particles but below the yellow particles because the green particles carry a higher charge potential than the white particles. The yellow particles are closest to the common electrode side, and the green and white particles are hidden underneath the yellow particles. As a result, a yellow color is seen at the viewing side (see 2(a)).

In FIG. 2-1, when a high positive driving voltage (e.g., +15V) is applied to the pixel 2(a) for a time period of sufficient length, an electric field of a positive polarity is generated which causes the particle distribution to be opposite of that shown in FIG. 2(a) and as a result, a black color is seen at the viewing side.

It is also noted that the high driving voltage applied in FIG. 2-1 may be a single pulse as shown in FIG. 3a or 3b or a pulsing waveform as shown in FIG. 4a or 4b.

The pulsing waveform has alternating 0V and a driving voltage. The magnitude of the driving voltage referred to may be or may not be the same as that of the driving voltage for the single pulse method. There may be 10-200 cycles of pulsing. The pulsing waveform may lead to better color performance because it can prevent aggregation of the particles with each other, which usually causes reduction of hiding power of the layers of the particles.

FIG. 2-2:

In FIG. 2-2, when a low positive driving voltage (e.g., +3V) is applied to the pixel of FIG. 2(a) (that is, driven from the yellow state) for a time period of sufficient length, an electric field is generated to cause the high negative yellow particles and mid negative green particles to move towards the pixel electrode (22a) while the high positive black and mid positive blue particles move towards the common electrode (21). However, when they meet in the middle of the pixel, they significantly slow down and remain there because the electric field generated by the low driving voltage is not strong enough to overcome the attraction forces between them. As shown, the yellow, green, black and blue particles stay in the middle of the pixel in a mixed state.

The term "attraction force" in the context of the present application, encompasses electrostatic interactions, linearly dependent on the particle charge potentials, and the attraction force can be further enhanced by introducing other forces, such as Van der Waals forces, hydrophobic interactions or the like.

On the other hand, there are also attraction forces between low positive red particles with the high negative yellow particles and mid negative green particles, and the low negative white particles with high positive black and the mid positive blue particles. However, these attraction forces are not as strong as the attraction forces between the black, blue, yellow and green particles, and therefore they can be overcome by the electric field generated by the low driving voltage. In other words, the low charged particles and the high or mid charged particles of opposite polarity can be separated.

In addition, the electric field generated by the low driving voltage is sufficient to separate the low negative white particles and low positive red particles to cause the red particles to move to the common electrode (21) side (i.e., the viewing side) and the white particles to move to the pixel electrode (22a) side. As a result, a red color is seen. In this case, the white particles are closest to the pixel electrode.

Figures 2, 3:
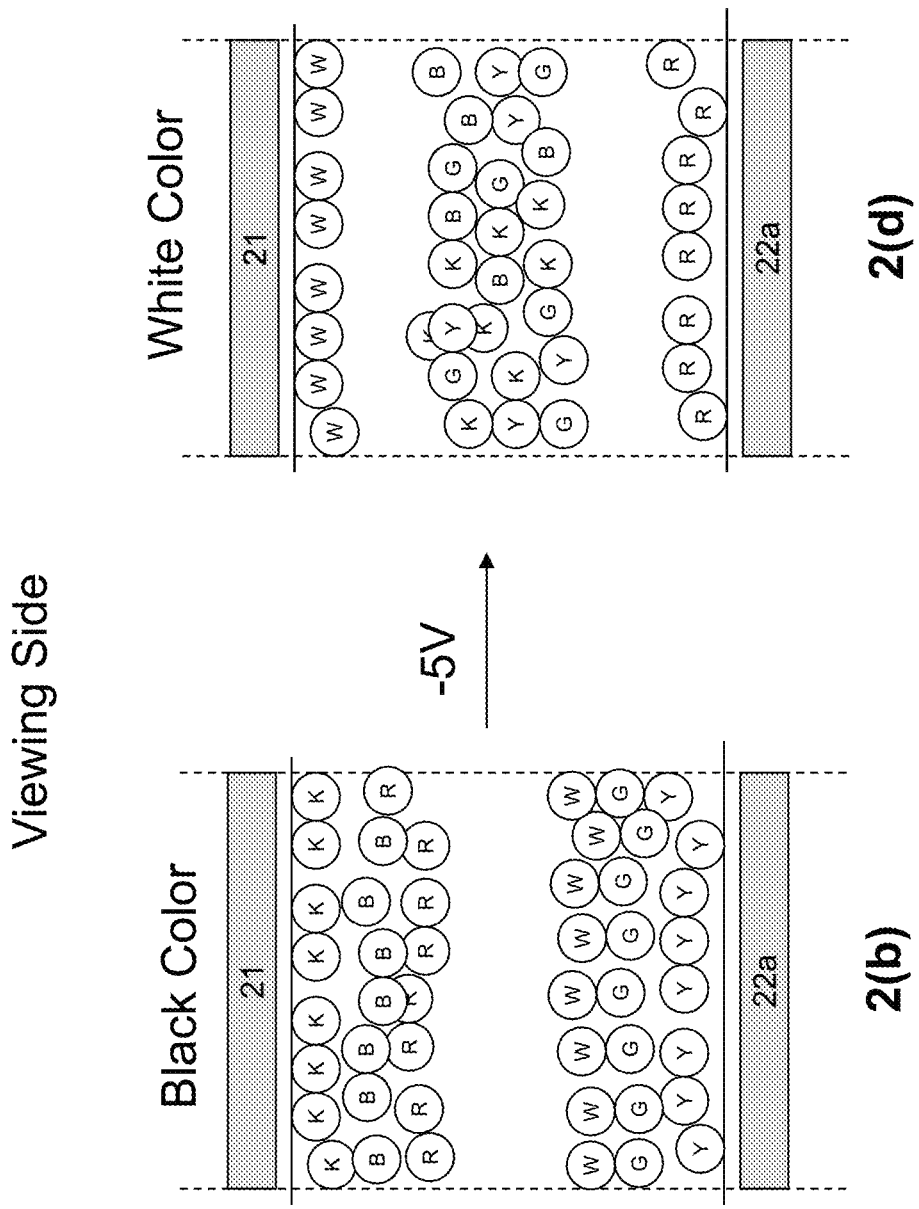
Figures 2, 3, 4, 5:
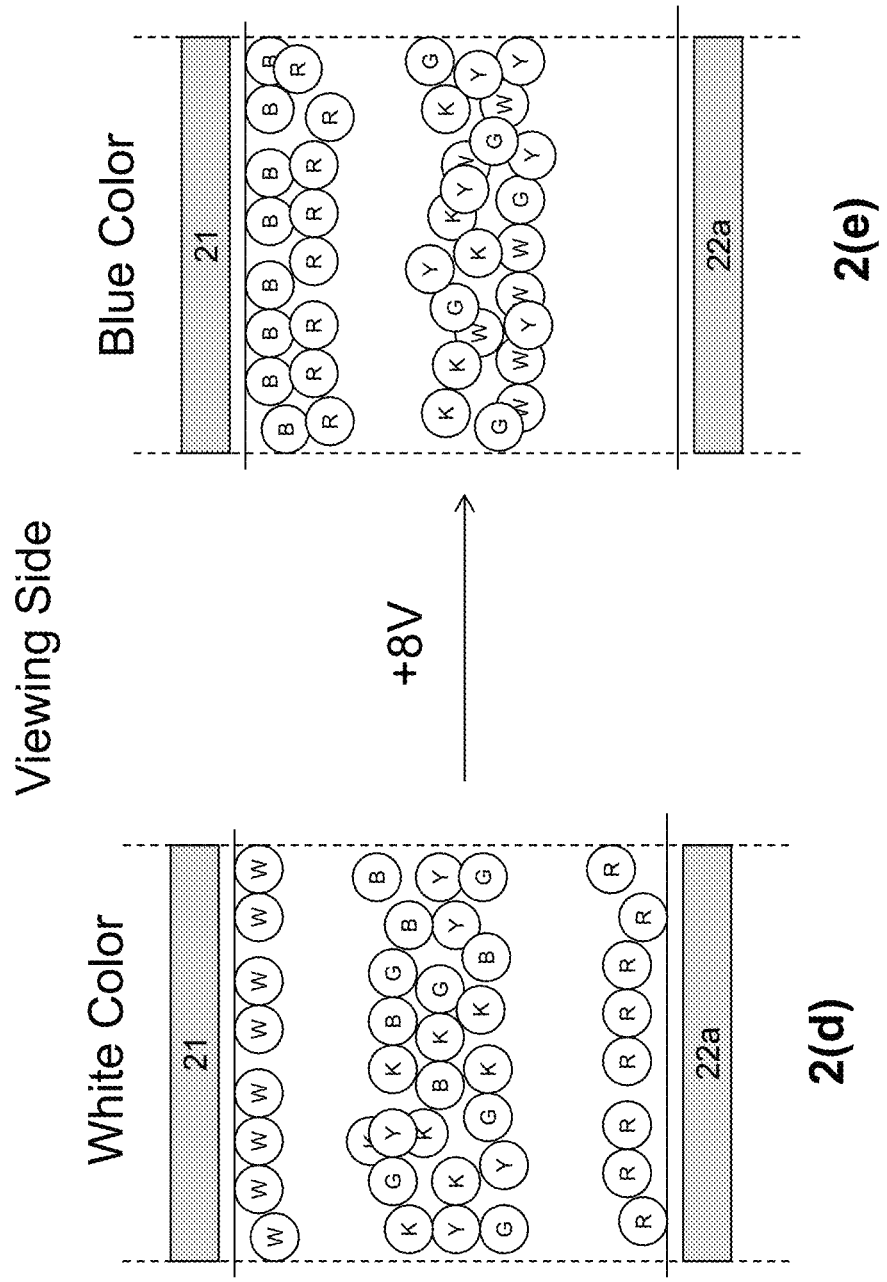

The low positive driving voltage in FIG. 2-2 may be applied as a single pulse as shown in FIG. 3 or a pulsing waveform as shown in FIG. 4. The magnitude of the driving voltage in the pulsing waveform may be the same as, or different from, that of the single driving pulse. In the pulsing waveform, there may be 10-200 cycles of pulsing.

FIG. 2-3:

In FIG. 2-3, when a low negative driving voltage (e.g., −5V) is applied to the pixel of FIG. 2(b) (that is, driven from the black state) for a time period of sufficient length, an electric field is generated which causes the high positive black and the mid positive blue particles to move towards the pixel electrode (22a) while the high negative yellow particles and the mid negative green particles move towards the common electrode (21). However, when they meet in the middle of the pixel, they significantly slow down and remain there because the electric field generated by the low driving voltage is not strong enough to overcome the attraction between them. As shown, the yellow, green, black and blue particles stay in the middle of the pixel in a mixed state.

At the same time, there are also attraction forces between the low positive red particles with high negative yellow particles and the mid negative green particles, and between low negative white particles with high positive black and the mid positive blue particles. However, these attraction forces are not as strong as the attraction forces between the black, blue, yellow and green particles, and therefore they can be overcome by the electric field generated by the low driving voltage. In other words, low charged particles and the high or mid charged particles of opposite polarity can be separated.

In addition, the electric field generated by the low driving voltage is sufficient to separate the low negative white particles and the low positive red particles to cause the white particles to move to the common electrode side (i.e., the viewing side) and the red particles move to the pixel electrode side. As a result, a white color is seen. The red particles, in this case, are closest to the pixel electrode.

The low negative driving voltage may be applied as a single pulse as shown in FIG. 3 or a pulsing waveform as shown in FIG. 4. The magnitude of the driving voltage in the pulsing waveform may be the same as, or different from, that of the single driving pulse. In the pulsing waveform, there may be 10-200 cycles of pulsing.

It is noted that magnitude of +3V in FIG. 2-2 is different from the magnitude of −5V in FIG. 2-3. This is due to the fact that, as stated above, the magnitude of the charge carried by the mid positive particles may be different from the magnitude of the charge carried by the mid negative particles, and the magnitude of the charge carried by the low positive particles may be different from the magnitude of the charge carried by the low negative particles.

The driving methods of FIGS. 2-2 and 2-3 can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles, a fifth type of particles and a sixth type of particles, all of which are dispersed in a solvent or solvent mixture, wherein:

(a) the six types of pigment particles have optical characteristics differing from one another;

(b) the first and second types of particles carry opposite charge polarities;

(c) the third and fifth types of particles carry the same charge polarity as the first type of particles, and the first type, the third type and the fifth type of particles have progressively lower magnitudes; and (d) the fourth and sixth types of particles carry the same charge polarity as the second type of particles, and the second type, the fourth type and the sixth type of particles have progressively lower magnitudes, the method comprises
(i) applying a driving pulse or a pulsing waveform of alternating a driving voltage and no driving voltage, to a pixel in the electrophoretic display, wherein the pixel is in a color state of the first type of particles and the driving pulse or the driving voltage has the opposite polarity as the first type of particles to drive the pixel towards a color state of the sixth type of particles at the viewing side, or
(ii) applying a driving voltage or a pulsing waveform of alternating a driving voltage and no driving voltage, to a pixel in the electrophoretic display, wherein the pixel is in the color state of the second type of particles and the driving voltage has the opposite polarity as the second type of particles to drive the pixel towards the color state of the fifth type of particles at the viewing side.

In this driving method, the driving voltage referred to is a low driving voltage.

There are alternative driving schemes which may be used to drive a pixel from black to white or yellow to red, which schemes are described in a section below.

FIG. 2-4:

FIG. 2-4 shows how a blue color state (which is the color of the second highest positively charged particles) may be driven from the white state (which is the color of the lowest negatively charged particles).

In one scenario, a medium positive driving voltage (e.g., +12V) is applied to a pixel of 2(d) in the white state. The voltage applied is not sufficient to separate the high positive black from the high negative yellow particles, but sufficient to cause the mid positive blue particles and the mid negative green particles to break away from the pack.

In this scenario, the mid positive blue particles and the low positive red particles move to the viewing side while the red particles move slower than the blue particles because the red particles carry a lower charge potential. In addition, the blue particles were closer to the common electrode side. As a result, a blue color is seen at the viewing side.

The mid negative green particles and the low negative white particles move to the non-viewing side while the white particles move slower than the green particles because the white particles carry a lower charge potential. In addition, the green particles were closer to the pixel electrode. As a result, a green color appears at the pixel electrode side.

It is noted that in this process, when the white particles pass the black and yellow particles in the middle area to move towards the pixel electrode, the electric field generated by the mid positive driving voltage of +12V is sufficient to separate the low negative white from the high positive black particles. Similarly, the low positive red particles may be separated from the high negative yellow particles when they move from the pixel electrode side to the common electrode side.

However, as stated, because the blue particles have a higher charge potential and move faster than the red particles, and they were also closer to the common electrode side, they reach the common electrode side before the red particles. As a result, a high-quality blue color can be seen at the viewing side.

This single pulse method with a medium positive driving voltage may lead to the blue color state, with proper timing. The driving time for the single pulse may be in the range of about 100 to about 2,000 msec. If the pulse is applied for too long, the red particles will catch up with the blue particles on the viewing side, which may cause some red tint appearing in the blue state.

Alternatively, the driving as shown in FIG. 2-4 may be achieved by a pulsing waveform as shown in FIG. 4. The pulsing waveform has alternating 0V and a driving voltage. The driving voltage referred to has a magnitude which may or may not be the same as that of the driving voltage for the single pulse method. There may be 10-200 cycles of pulsing. The pulsing waveform may lead to better color performance because it can prevent aggregation of the blue particles with each other, which usually causes reduction of hiding power of the layers of the particles.

FIG. 2-5:

Alternatively, the blue state may also be achieved according to FIG. 2-5. A mid positive driving voltage (e.g., +8V) is applied to a pixel of 2(d) in the white state. The electric field generated by this driving voltage applied is also not sufficient to separate the high positive black from the high negative yellow particles, but sufficient to cause the mid positive blue particles to break away from the pack and move towards the viewing side.

The red particles, as explained above, also move towards the common electrode side, but slower than the blue particles.

FIG. 2-5, however, introduces the possibility that the electric field generated by the driving voltage of +8V is not sufficient to separate the mid negative green particles and the low negative white particles from the high positive black particles. As a result, when the blue color state is seen at the viewing side, the non-viewing side may show a mixed color state of yellow, green white and black.

This scenario is possible because the magnitude of the mid positive blue particles is not the same as the magnitude of the mid negative green particles and the magnitude of the low positive red particles is not the same as the magnitude of the low negative white particles.

This driving sequence may also be accomplished by a single pulse method as shown in FIG. 3 or a pulsing waveform of FIG. 4.

It should also be noted that in FIG. 2-4, a green color is at the pixel electrode side and in FIG. 2-5, a mixed color is at the pixel electrode side.

There is another possibility which is not shown in these figures, that is, when a positive voltage is applied to the pixel of 2(d), because of the different charge potentials carried by the green and white particles, only the green particles are trapped by the high positive black particles and the white particles may break free from the pack and move to the pixel electrode side. In this scenario, a white color is at the pixel electrode side.

FIG. 2-6:

FIG. 2-6 shows how a green color state (which is the color of the second highest negatively charged particles) may be driven from the red state (which is the color of the lowest positively charged particles).

In one scenario, a medium negative driving voltage (e.g., −10V) is applied to a pixel of 2(c) in the red state. The voltage applied is not sufficient to separate the high positive black particles from the high negative yellow particles, but sufficient to cause the mid negative green particles and the mid positive blue particles to break away from the pack.

In this scenario, the mid negative green particles and the low negative white particles move to the viewing side while the white particles move slower than the green particles because the white particles carry a lower charge potential. In addition, the green particles were closer the common electrode side. As a result, a green color is seen at the viewing side.

The mid positive blue particles and the low positive red particles move to the non-viewing side while the red particles move slower than the blue particles because the red particles carry a lower charge potential. In addition, the blue particles were closer to the pixel electrode side. As a result, a blue color appears at the pixel electrode.

It is noted that in this process, when the red particles pass the black and yellow particles in the middle area to move towards the pixel electrode, the electric field generated by the mid negative driving voltage of −10V is sufficient to separate the low positive red particles from the high negative yellow particles. Similarly, the low negative white particles may be separated from the high positive black particles when they move from the pixel electrode side to the common electrode side.

However, as stated, because the green particles have a higher charge potential and move faster than the white particles, and were closer to the common electrode in the starting pixel 2(a), they reach the common electrode side before the white particles. As a result, a high-quality green color can be seen at the viewing side.

This single pulse method with a medium negative driving voltage may lead to the green color state, with proper timing. The driving time for the single pulse may be in the range of about 100 to about 2,000 msec. If the pulse is applied for too long, the white particles will catch up with the green particles on the viewing side, which may cause the green color to be in a lighter shade.

Alternatively, the driving as shown in FIG. 2-6 may be achieved by a pulsing waveform as shown in FIG. 4. The pulsing waveform has alternating 0V and a driving voltage. The driving voltage referred to has a magnitude which may or may not be the same as that of the driving voltage for the single pulse method. There may be 10-200 cycles of pulsing. The pulsing waveform may lead to better color performance because it can prevent aggregation of the green particles with each other, which usually causes reduction of hiding power of the layers of the particles.

FIG. 2-7:

Alternatively, the green state may also be achieved according to FIG. 2-7. A mid negative driving voltage (e.g., −8V) is applied to a pixel of 2(c) in the red state. The electric field generated by this driving voltage applied is also not sufficient to separate the high positive black from the high negative yellow particles, but sufficient to cause the mid negative green particles to break away from the pack and move towards the viewing side.

The white particles, as explained above, also move towards the common electrode side, but slower than the green particles.

FIG. 2-7, however, introduces the possibility that the electric field generated by the driving voltage of −8V is not sufficient to separate the mid positive blue particles and the low positive red particles from the high negative yellow particles. As a result, when the green color state is seen at the viewing side, the non-viewing side may show a mixed color state of yellow, blue, red and black.

This scenario is possible because the magnitude of the mid negative green particles is not the same as the magnitude of the mid positive blue particles, and the magnitude of the low negative white particles is not the same as the magnitude of the low positive red particles.

This driving sequence may also be accomplished by a single pulse method as shown in FIG. 3 or a pulsing waveform of FIG. 4.

It should also be noted that in FIG. 2-6, a blue color is at the pixel electrode side and in FIG. 2-7, a mixed color is at the pixel electrode side.

There is another possibility which is not shown in these figures, that is, when a positive voltage is applied to the pixel of 2(c), because of the different charge potentials carried by the blue and red particles, only the blue particles are trapped by the high negative yellow particles and the red particles may break free from the pack and move to the pixel electrode side. In this scenario, a red color appears at the pixel electrode side.

In summary, the driving methods of FIGS. 2-4, 2-5, 2-6 and 2-7 can be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles, a fifth type of particles and a sixth type of particles, all of which are dispersed in a solvent or solvent mixture, wherein:

(a) the six types of pigment particles have optical characteristics differing from one another;

(b) the first and second types of particles carry opposite charge polarities;

(c) the third and fifth types of particles carry the same charge polarity as the first type of particles and the first type, the third type and the fifth type have progressively lower magnitudes; and (d) the fourth and sixth types of particles carry the same charge polarity as the second type of particles and the second type, the fourth type and the sixth type have progressively lower magnitudes, the method comprises (i) applying a driving voltage or a pulsing waveform with alternating a driving voltage and no driving voltage, to a pixel in the electrophoretic display, wherein the pixel is in the color state of the sixth type of particles and the driving voltage has the opposite polarity as sixth type of particles, to drive the pixel towards the color state of the third type of particles at the viewing side, or (ii) applying a driving voltage or a pulsing waveform with alternating a driving voltage and no driving voltage, to a pixel in the electrophoretic display, wherein the pixel is in the color state of the fifth type of particles and the driving voltage has the opposite polarity as fifth type of particles, to drive the pixel towards the color state of the fourth type of particles at the viewing side.

The driving voltage referred to in FIGS. 2-4, 2-5, 2-6 and 2-7 is a medium driving voltage.

As shown in this example, there are three levels of positive driving voltage, high positive, medium positive and low positive, and three levels of negative driving voltage, high negative, medium negative and low negative. The medium positive driving voltage may be 40% to 100%, preferably 50% to 90%, of the high positive driving voltage, and the low positive driving voltage may be 5% to 50%, preferably 15% to 40%, of the high positive driving voltage. The medium negative driving voltage may be 40% to 90%, preferably 50% to 80%, of the high negative driving voltage, and the low negative driving voltage may be 10% to 90%, preferably 30% to 70%, of high negative driving voltage.

The "high" driving voltage (positive or negative) referred to above is usually the driving voltage required to drive a pixel from a color state of one type of the highest charged particles to a color state of another type of highest charged particles which are oppositely charged. In the example above, the high driving voltage would be the voltage applied for driving a pixel from the black state to the yellow state, or vice versa.

Alternative Driving Schemes

Figures 2, 3, 4, 5, 6:
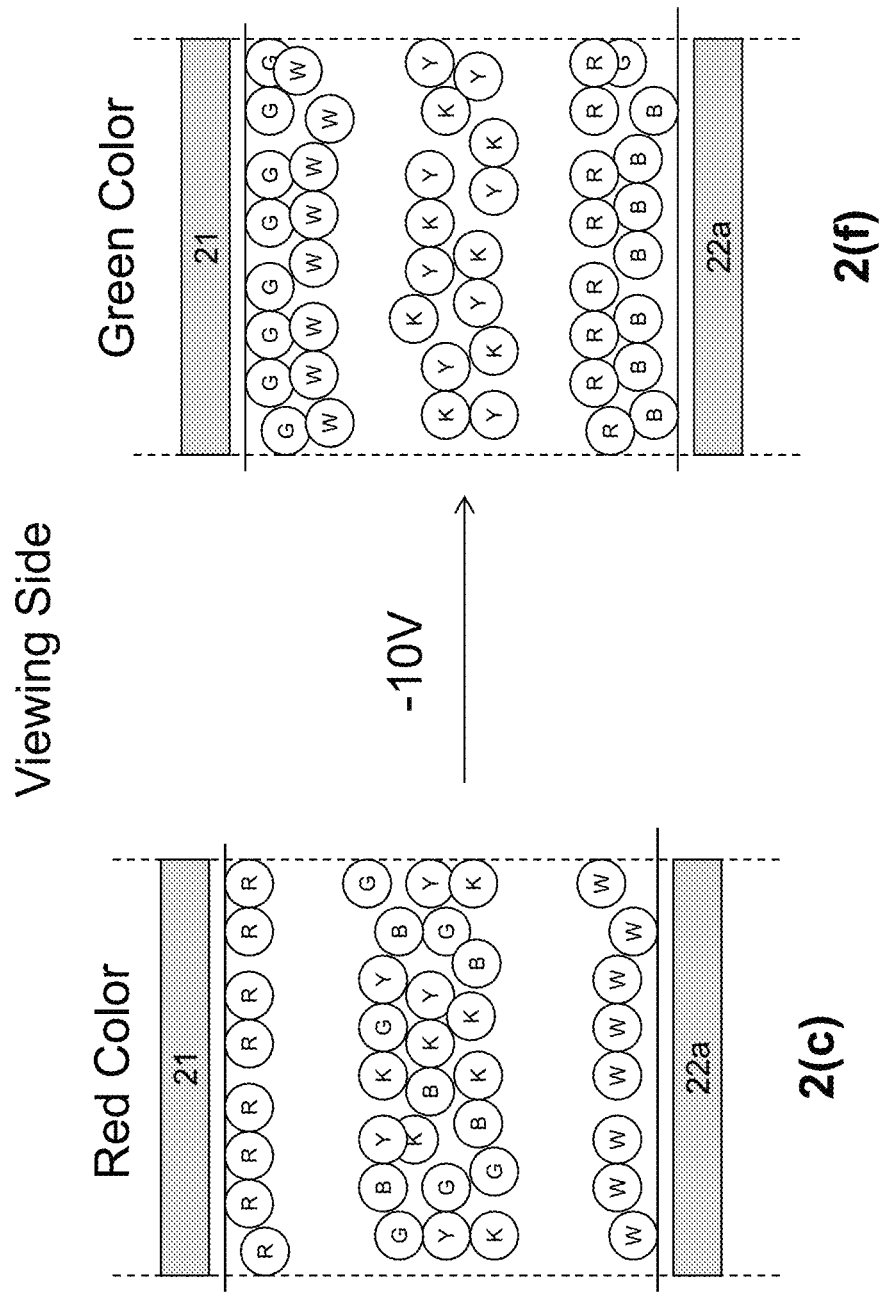

FIGS. 5 and 6 depict a set of driving schemes which are useful for driving a pixel from a black state (which is the color state of the highest positive particles) to a white state (which is the color state of the lowest negative particles, or for driving a pixel from a yellow state (which is the color state of the highest negative particles to a red state (which is the color state of the lowest positive particles).

As shown in FIG. 5, in an initial step, a high negative driving voltage (V2, e.g., −15V) is applied to a pixel for a period of t1 to drive the pixel towards the yellow state, which is followed by a positive driving voltage (+V1') for a period of t2 to drive the pixel towards the red state. The magnitude of +V1' is lower than that of V2. In one embodiment, the magnitude of the +V1' is less than 50% of the magnitude of V2. In one embodiment, t2 is greater than t1. In one embodiment, t1 may be in the range of 20-400 msec and t2 may be ≥200 msec.

The waveform of FIG. 5 is repeated for at least 2 cycles (N≥2), preferably at least 4 cycles and more preferably at least 8 cycles. The red color becomes more intense after each driving cycle.

As shown in FIG. 6, in an initial step, a high positive driving voltage (V1, e.g., +15V) is applied to a pixel for a period of t3 to drive the pixel to the black state, which is followed by a negative driving voltage (−V2') for a period of t4 to drive the pixel towards the white state. The magnitude of −V2' is lower than that of V1. In one embodiment, the magnitude of the −V2' is less than 50% of the magnitude of V1. In one embodiment, t4 is greater than t3. In one embodiment, t3 may be in the range of 20-400 msec and t4 may be ≥200 msec.

The waveform of FIG. 6 is repeated for at least 2 cycles (N≥2), preferably at least 4 cycles and more preferably at least 8 cycles. The white color becomes more intense after each driving cycle.

The white and red color states achieved by these alternative driving schemes may be used as a starting color of a pixel to be driven to other color states. For example, the red color state achieved in FIG. 5 may be driven to the green state or the white color state achieved in FIG. 6 may be driven to the blue state, as described in previous sections.

The driving methods of FIGS. 5 and 6 may be summarized as follows:

A driving method for an electrophoretic display comprising a first surface on the viewing side, a second surface on the non-viewing side and an electrophoretic fluid which fluid is sandwiched between a common electrode and a layer of pixel electrodes and comprises a first type of particles, a second type of particles, a third type of particles, a fourth type of particles, a fifth type of particles and a sixth type of particles, all of which are dispersed in a solvent or solvent mixture, wherein:

(a) the six types of pigment particles have optical characteristics differing from one another;
(b) the first and second types of particles carry opposite charge polarities;
(c) the third and fifth types of particles carry the same charge polarity as the first type of particles, and the first type, the third type and the fifth type of particles have progressively lower magnitudes; and
(d) the fourth and sixth types of particles carry the same charge polarity as the second type of particles, and the second type, the fourth type and the sixth type of particles have progressively lower magnitudes, the method comprises the following steps:
(i) applying a first driving voltage to a pixel of the electrophoretic display for a first period of time to drive the pixel towards the color state of the second type of particles;
(ii) applying a second driving voltage to the pixel for a second period of time, wherein the second driving voltage has same polarity as the fifth type of particles and a magnitude lower than that of the first driving voltage, to drive the pixel from the color state of the second type of particles towards the color state of the fifth type of particles to appear at the viewing side; and
repeating steps (i) and (ii).

Alternatively, the method may comprises the following steps:
(i) applying a first driving voltage to a pixel of the electrophoretic display for a first period of time to drive the pixel towards the color state of the first type of particles;
(ii) applying a second driving voltage to the pixel for a second period of time, wherein the second driving voltage has same polarity as the sixth type of particles and a magnitude lower than that of the first driving voltage, to drive the pixel from the color state of the first type of particles towards the color state of the sixth type of particles to appear at the viewing side; and
repeating steps (i) and (ii).

In one embodiment, the magnitude of the second driving voltage is less than 50% of the magnitude of the first driving voltage. In one embodiment, steps (i) and (ii) are repeated at least 2 times, preferably at least 4 times and more preferably at least 8 times.

In the present invention, since the six color states are controlled by varying voltage levels and each particle type/color can occupy 100% of the pixel area at a particular driving voltage, brightness of each individual color state is not compromised. This type of full color EPD display will provide not only the non-compromising white and black states, but also non-compromising color states of other colors, such as red, green and blue.

As described, each of the pixels can display six color states. More color states may be displayed if a pixel consists of three sub-pixels and each of the sub-pixels, as described above, can display six color states. For example, one of the six color states may be displayed by the pixel if all three sub-pixels display that color. In addition, if the three sub-pixels display red, blue and black color states respectively, the pixel will be seen in a magenta color state. If the three sub-pixels display green, blue and black color states respectively, the pixel will be seen in a cyan color state. If the three sub-pixels display red, green and black color states respectively, the pixel will be seen in a yellow color state.

More color states may be displayed through adjusting driving waveforms or image processing.

The electrophoretic fluid as described above is filled in display cells. The display cells may be microcells as described in U.S. Pat. No. 6,930,818, the content of which is incorporated herein by reference in its entirety. The display cells may also be other types of micro-containers, such as microcapsules, microchannels or equivalents, regardless of their shapes or sizes. All of these are within the scope of the present application.

Figures 2, 3, 4, 5, 6, 7:
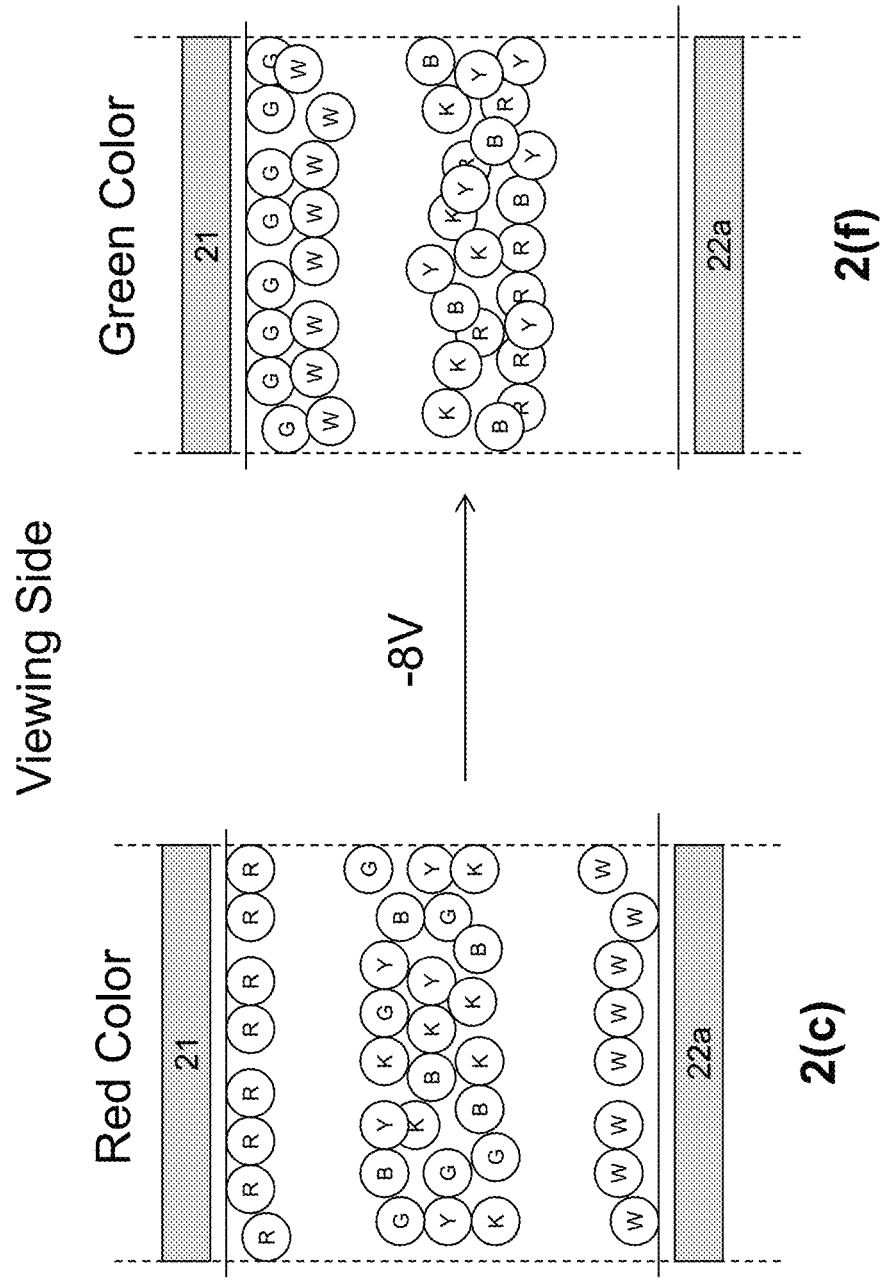
Figure 3:
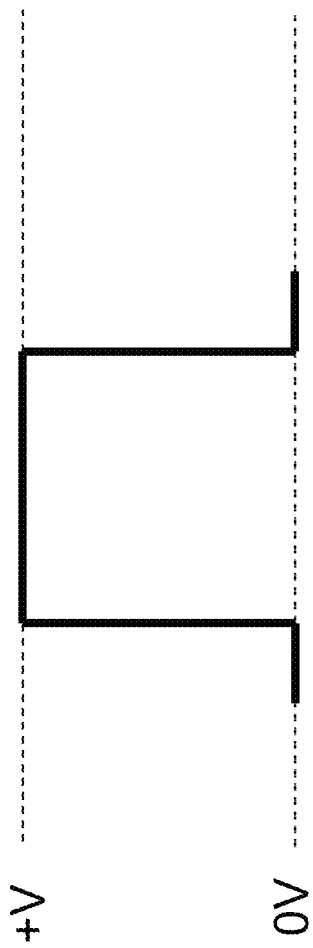
Figure 3:
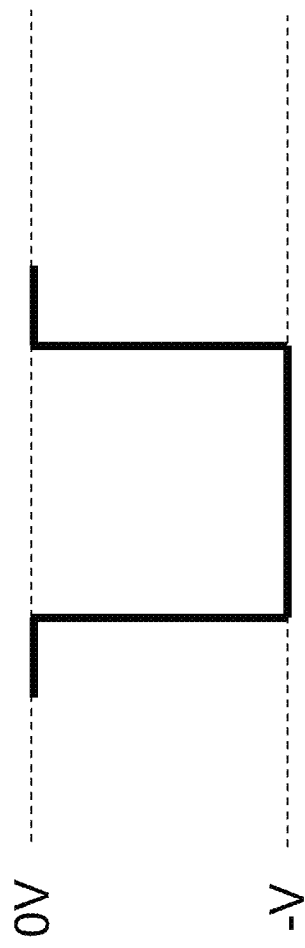
Figure 4:
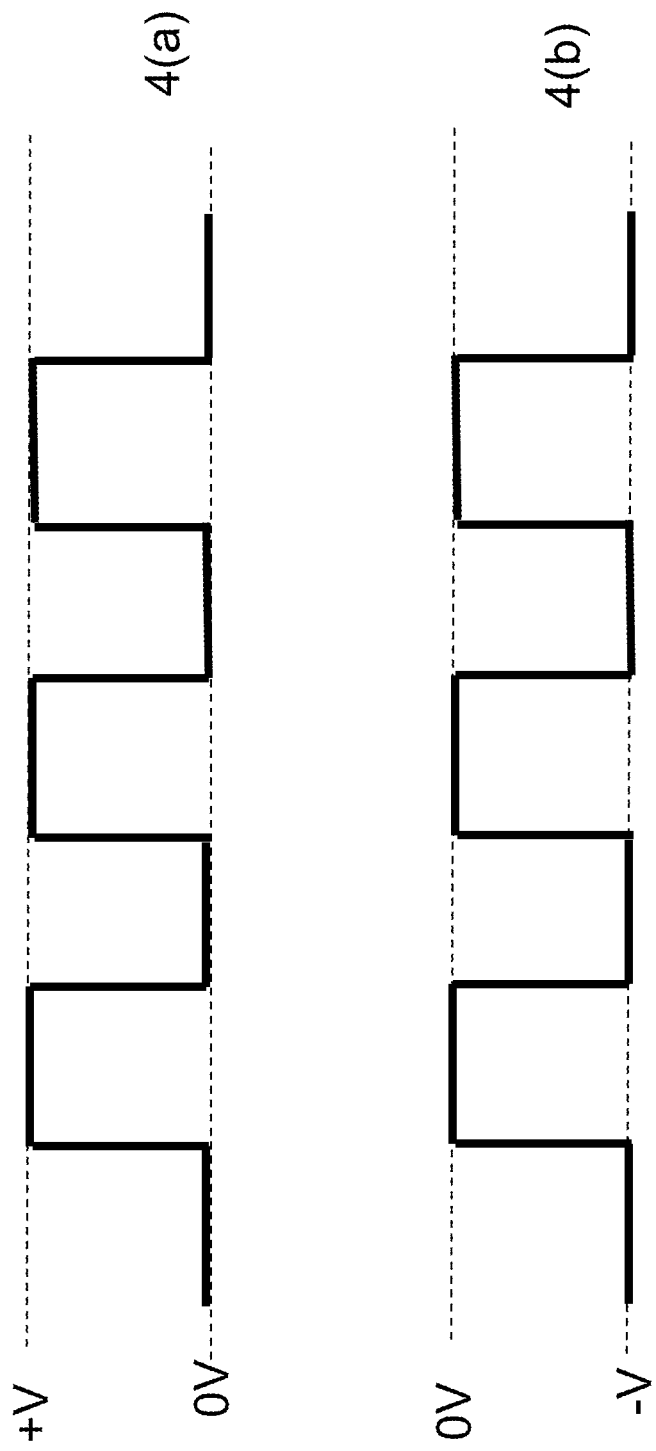
Figure 5:
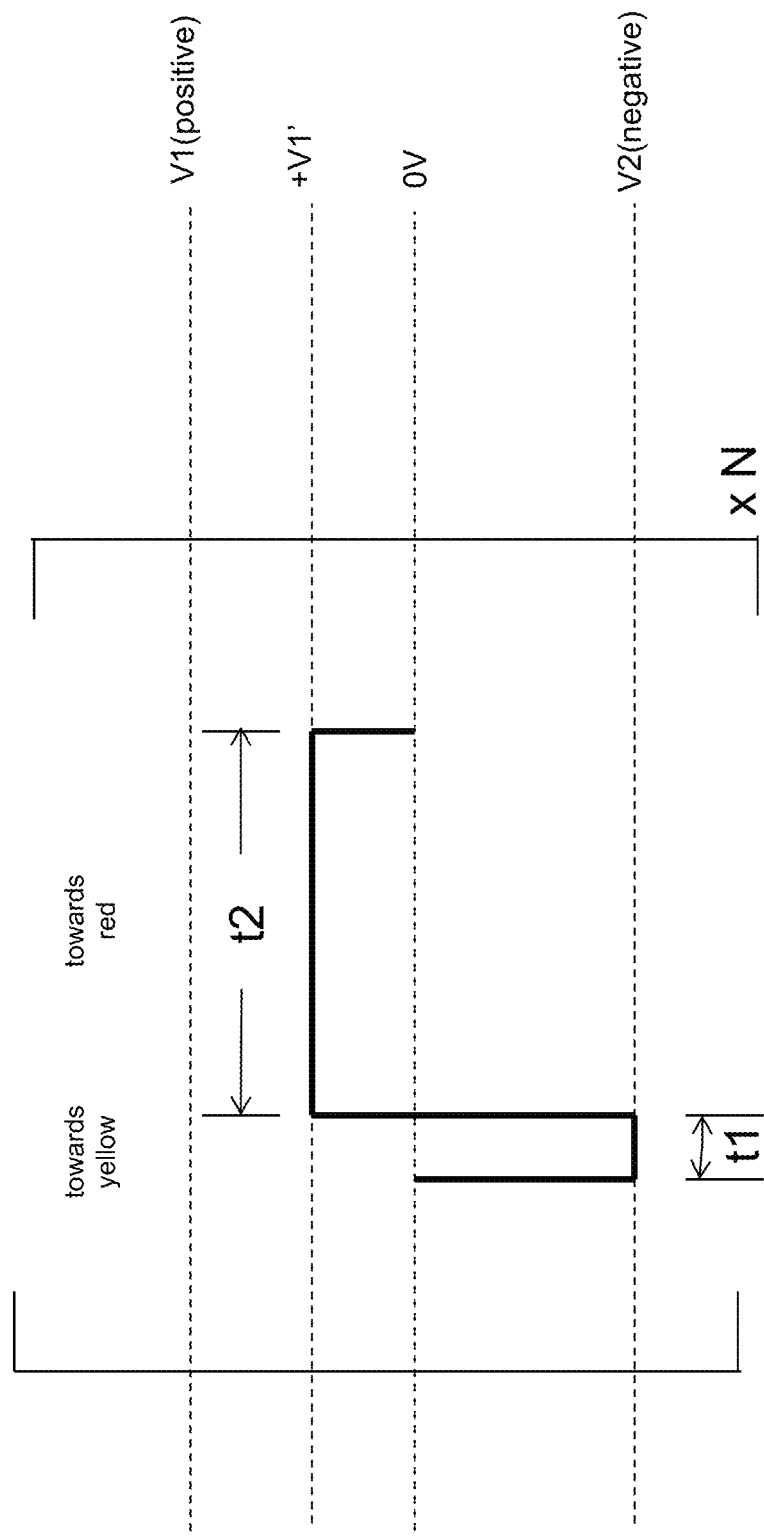
Figure 6:
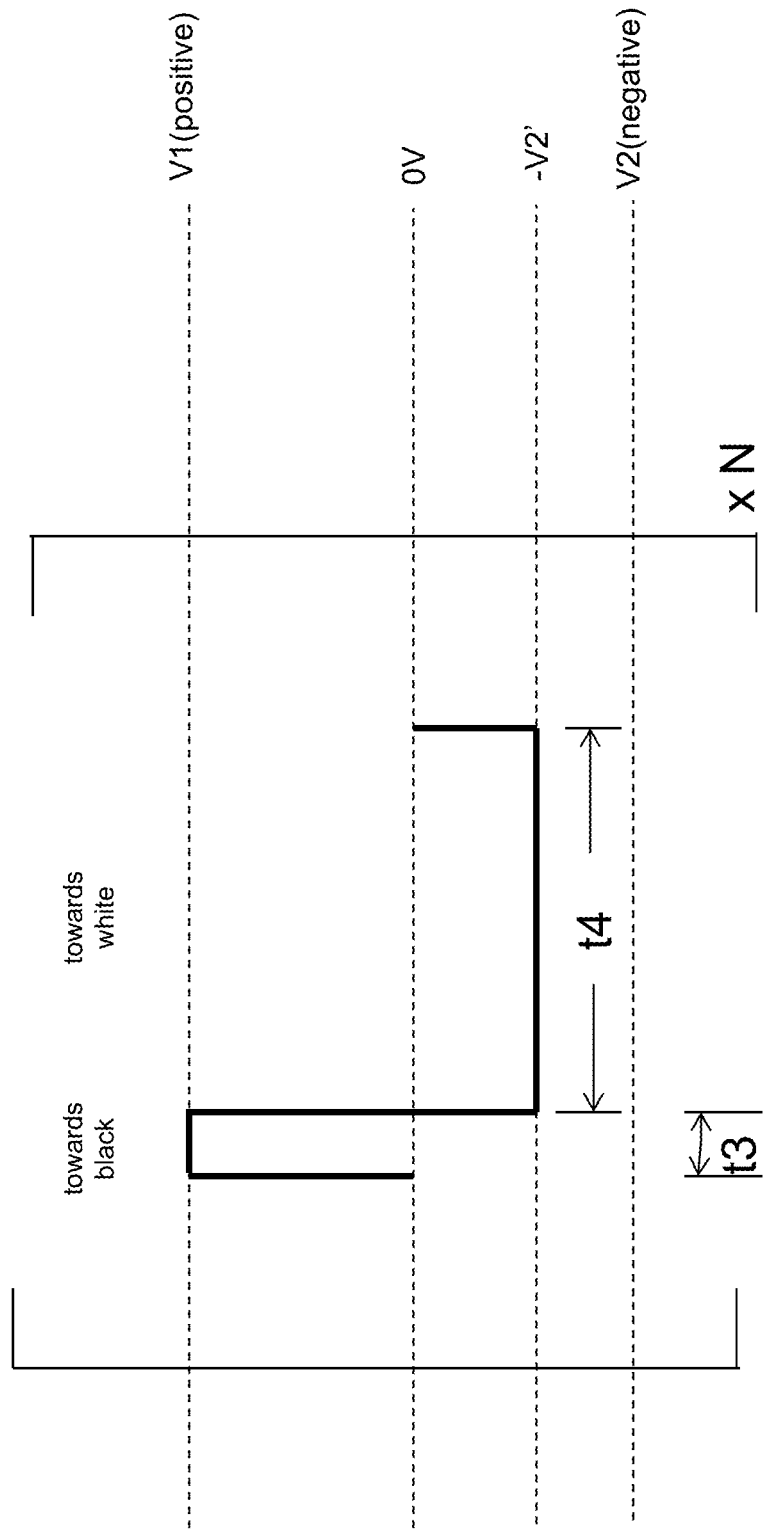
Figure 7:
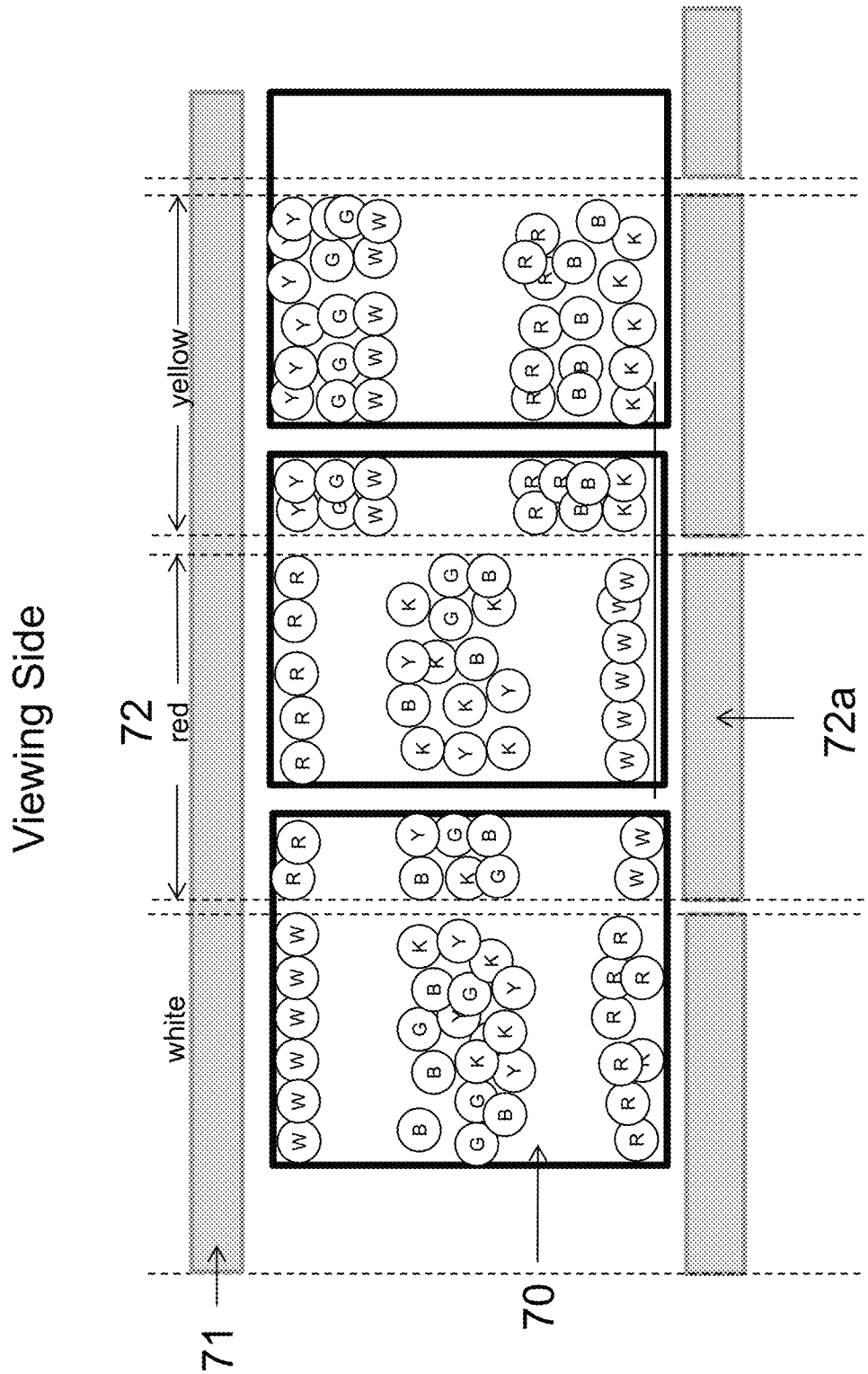

FIG. 7 is a cross-section view of an array of display cells. As shown, the display cells (70) and the pixel electrodes (72a) do not have to be aligned. Each pixel (72) may display a color state depending on the driving voltage applied between the common electrode (71) and the corresponding pixel electrode (72a). However, because the display cells and the pixel electrodes are not aligned, a display cell may be associated with more than one pixel electrode, which leads to the possibility of a display cell displaying more than one color state, as shown.

The display device of the present invention, in addition to the common display applications, may also be used for decoration purposes, for example, in clothing and accessories (e.g., hats, shoes or wrist bands).

In a further aspect of the present invention, the fluid of the present invention may further comprise substantially uncharged neutral buoyancy particles.

The term "substantially uncharged" refers to the particles which are either uncharged or carry a charge which is less than 5% of the average charge carried by the higher charged particles. In one embodiment, the neutral buoyancy particles are non-charged.

The term "neutral buoyancy" refers to particles which do not rise or fall with gravity. In other words, the particles would float in the fluid between the two electrode plates. In one embodiment, the density of the neutral buoyancy particles may be the same as the density of the solvent or solvent mixture in which they are dispersed.

The concentration of the substantially uncharged neutral buoyancy particles in the display fluid is preferably in the range of about 0.1 to about 10% by volume, more preferably in the range of about 0.1 to about 5% by volume.

The term "about" refers to a range which is ±10% of the indicated value.

The substantially uncharged neutral buoyancy particles may be formed from a polymeric material. The polymeric material may be a copolymer or a homopolymer.

Examples of the polymeric material for the substantially uncharged neutral buoyancy particles may include, but are not limited to, polyacrylate, polymethacrylate, polystyrene, polyaniline, polypyrrole, polyphenol and polysiloxane. Specific examples of the polymeric material may include, but are not limited to, poly(pentabromophenyl methacrylate), poly(2-vinylnapthalene), poly(naphthyl methacrylate), poly(alpha-methyl styrene), poly(N-benzyl methacrylamide) and poly(benzyl methacrylate).

More preferably, the substantially uncharged neutral buoyancy particles are formed from a polymer which is not soluble in the solvent of the display fluid, and also has a high refractive index. In one embodiment, the refractive index of the substantially uncharged neutral buoyancy particles is different from that of the solvent or solvent mixture in which the particles are dispersed. However, typically the refractive index of the substantially uncharged neutral buoyancy particles is higher than that of the solvent or solvent mixture. In some cases, the refractive index of the substantially uncharged neutral buoyancy particles may be above 1.45.

In one embodiment, the materials for the substantially uncharged neutral buoyancy particles may comprise an aromatic moiety.

The substantially uncharged neutral buoyancy particles may be prepared from monomers through polymerization techniques, such as suspension polymerization, dispersion polymerization, seed polymerization, soap-free polymerization, emulsion polymerization or physical method, including inverse emulsification-evaporation process. The monomers are polymerized in the presence of a dispersant. The presence of the dispersant allows the polymer particles to be formed in a desired size range and the dispersant may also form a layer physically or chemically bonded to the surface of the polymer particles to prevent the particles from agglomeration.

The dispersant preferably has a long chain (of at least eight atoms), which may stabilize the polymer particles in a hydrocarbon solvent. Such dispersants may be an acrylate-terminated or vinyl-terminated macromolecule, which are suitable because the acrylate or vinyl group can co-polymerize with the monomer in the reaction medium.

One specific example of the dispersant is acrylate terminated polysiloxane (Gelest, MCR-M17, MCR-M22).

Another type of suitable dispersants is polyethylene macromonomers, as shown below:

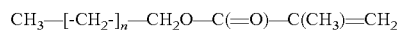

$$CH_3-[-CH_2-]_n-CH_2O-C(=O)-C(CH_3)=CH_2$$

The backbone of the macromonomer may be a polyethylene chain and the integer "n" may be 30-200. The synthesis of this type of macromonomers may be found in Seigou Kawaguchi et al, Designed Monomers and Polymers, 2000, 3, 263.

If the fluid system is fluorinated, the dispersants are then preferably also fluorinated.

Alternatively, the substantially uncharged neutral buoyancy particles may also be formed from a core particle coated with a polymeric shell and the shell may be formed, for example, from any of the polymeric material identified above.

The core particle may be of an inorganic pigment such as $TiO_2$, $ZrO_2$, ZnO, $Al_2O_3$, CI pigment black 26 or 28 or the like (e.g., manganese ferrite black spinel or copper chromite black spinel), or an organic pigment such as phthalocyanine blue, phthalocyanine green, diarylide yellow, diarylide AAOT yellow, and quinacridone, azo, rhodamine, perylene pigment series from Sun Chemical, Hansa yellow G particles from Kanto Chemical, and Carbon Lampblack from Fisher, or the like.

In the case of core-shell substantially uncharged neutral buoyancy particles, they may be formed by a microencapsulation method, such as coacervation, interfacial polycondensation, interfacial cross-linking, in-suit polymerization or matrix polymerization.

The size of the substantially uncharged neutral buoyancy particles is preferably in the range of about 100 nanometers to about 5 microns.

In one embodiment of this aspect of the present invention, the substantially uncharged neutral buoyancy particles added to the fluid may have a color substantially the same visually to the color of one of the six types of charged particles. For example, in a display fluid, there may be charged white, black, red, yellow, green and blue particles and substantially uncharged neutral buoyancy particles, and in this case, the substantially uncharged neutral buoyancy particles may be white, black, red, yellow, green or blue.

In another embodiment, the substantially uncharged neutral buoyancy particles may have a color substantially different from the color of either one of the six types of charged particles.

The presence of the substantially uncharged neutral buoyancy particles in the fluid increases reflection of incident light, thus also improving the contrast ratio, especially if they are formed from a reflective material.

The image stability may also be improved by the addition of the substantially uncharged neutral buoyancy particles in the six particle fluid system. The substantially uncharged neutral buoyancy particles can fill in the gaps resulted from the charged particles being over packed on the surface of an electrode under an electrical field, thus preventing the charged particles from settling due to the gravitational force.

In addition, if the substantially uncharged neutral buoyancy particles are white, they may enhance the reflectivity of the display. If they are black, they may enhance the blackness of the display.

In any case, the substantially uncharged neutral buoyancy particles do not affect the driving behavior of the six types of charged particles in the fluid.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

The invention claimed is:

1. An electrophoretic display comprising a first, viewing surface and a second surface on the opposed side of the display layer from the first surface, and means for generating an electric field between the viewing surface and the second surface, the display layer comprising an electrophoretic medium comprising a fluid and first, second, third, fourth, fifth and sixth types of particles having respectively first, second, third, fourth, fifth and sixth optical characteristics differing from one another, the first, third and fifth types of particles being charges of one polarity and the second, fourth and sixth type of particles bearing charges of the opposite polarity, the electrophoretic display being characterized in that:
   (i) applying a first electric field having a high magnitude and a polarity driving the first type of particles towards the viewing surface causes the display layer to display the first optical characteristic at the viewing surface;
   (ii) applying a second electric field having a high magnitude and a polarity driving the second type of particles towards the viewing surface causes the display layer to display the second optical characteristic at the viewing surface;
   (iii) when the first optical characteristic is displayed at the viewing surface, applying a third electric field having a magnitude lower than the first electric field and a polarity driving the sixth type of particles towards the viewing surface causes the display layer to display the sixth optical characteristic at the viewing surface;
   (iv) when the second optical characteristic is displayed at the viewing surface, applying a fourth electric field having a magnitude lower than the second electric field and a polarity driving the fifth type of particles towards the viewing surface causes the display layer to display the fifth optical characteristic at the viewing surface;
   (v) when the sixth optical characteristic is displayed at the viewing surface, applying a fifth electric field having a magnitude lower that the first electric field but higher than the fourth electric field and a polarity driving the third type of particles towards the viewing surface causes the display layer to display the third optical characteristic at the viewing surface; and
   (vi) when the fifth optical characteristic is displayed at the viewing surface, applying a sixth electric field having a magnitude lower that the second electric field but higher than the third electric field and a polarity driving the fourth type of particles towards the viewing surface causes the display layer to display the fourth optical characteristic at the viewing surface.

2. The electrophoretic display of claim 1 wherein the first type of particles is black and the second type of particles is white or yellow.

3. The electrophoretic display of claim 1 wherein the optical characteristics of the six types of particles are selected from the group consisting of black, white, yellow, green, blue and red.

4. The electrophoretic display of claim 1 wherein the electrophoretic medium further comprises substantially uncharged neutral buoyancy particles.

5. A method for driving an electrophoretic display comprising a first, viewing surface and a second surface on the opposed side of the display layer from the first surface, and means for generating an electric field between the viewing surface and the second surface, the display layer comprising an electrophoretic medium comprising a fluid and first, second, third, fourth, fifth and sixth types of particles having respectively first, second, third, fourth, fifth and sixth optical characteristics differing from one another, the first, third and fifth types of particles being charges of one polarity and the second, fourth and sixth type of particles bearing charges of the opposite polarity, the method being characterized by, in any order:
   (i) applying a first electric field having a high magnitude and a polarity driving the first type of particles towards the viewing surface, thereby causing the display layer to display the first optical characteristic at the viewing surface;
   (ii) applying a second electric field having a high magnitude and a polarity driving the second type of particles towards the viewing surface, thereby causing the display layer to display the second optical characteristic at the viewing surface;
   (iii) when the first optical characteristic is displayed at the viewing surface, applying a third electric field having a magnitude lower than the second electric field and a polarity driving the sixth type of particles towards the viewing surface, thereby causing the display layer to display the sixth optical characteristic at the viewing surface;
   (iv) when the second optical characteristic is displayed at the viewing surface, applying a fourth electric field having a magnitude lower than the first electric field and a polarity driving the fifth type of particles towards the viewing surface, thereby causing the display layer to display the fifth optical characteristic at the viewing surface;
   (v) when the sixth optical characteristic is displayed at the viewing surface, applying a fifth electric field having a magnitude lower that the first electric field but higher than the fourth electric field and a polarity driving the third type of particles towards the viewing surface, thereby causing the display layer to display the third optical characteristic at the viewing surface; and
   (vi) when the fifth optical characteristic is displayed at the viewing surface, applying a sixth electric field having a magnitude lower that the second electric field but higher than the third electric field and a polarity driving the fourth type of particles towards the viewing surface, thereby causing the display layer to display the fourth optical characteristic at the viewing surface.

6. The method of claim 5 wherein at least one of the first to sixth electric fields is applied as a pulsed electric field alternating between a non-zero electric field and no electric field.

7. The method of claim 5 wherein the third electric field is from about 5 to about 50 percent of the second electric field and/or the fourth electric field is from about 5 to about 50 percent of the first electric field.

8. The method claim 5 wherein the fifth electric field is from about 40 to about 90 percent of the first electric field and/or the sixth electric field is from about 40 to about 90 percent of the second electric field.

9. The method of claim 5 wherein step (iii) is effected by (i) applying the first electric field to the electrophoretic medium for a first period of time; and (ii) thereafter applying the third electric field to the electrophoretic medium for a second period of time; and (iii) repeating steps (i) and (ii).

10. The method of claim 9 wherein the magnitude of the third electric field is less than about 50 percent of the magnitude of the second electric field.

11. The method of claim 9 wherein steps (i) and (ii) are repeated at least four times.

12. The method of claim 5 wherein step (iv) is effected by (i) applying the second electric field to the electrophoretic medium for a first period of time; and (ii) thereafter applying the fourth electric field to the electrophoretic medium for a second period of time; and (iii) repeating steps (i) and (ii).

13. The method of claim 12 wherein the magnitude of the fourth electric field is less than about 50 percent of the magnitude of the second electric field.

14. The method of claim 12 wherein steps (i) and (ii) are repeated at least four times.

\* \* \* \* \*